June 15, 1965  H. LERMAN  3,188,870
ARRANGEMENT FOR IMPROVING MANEUVERABILITY OF A STABLE PLATFORM
Filed Sept. 15, 1961  3 Sheets-Sheet 2

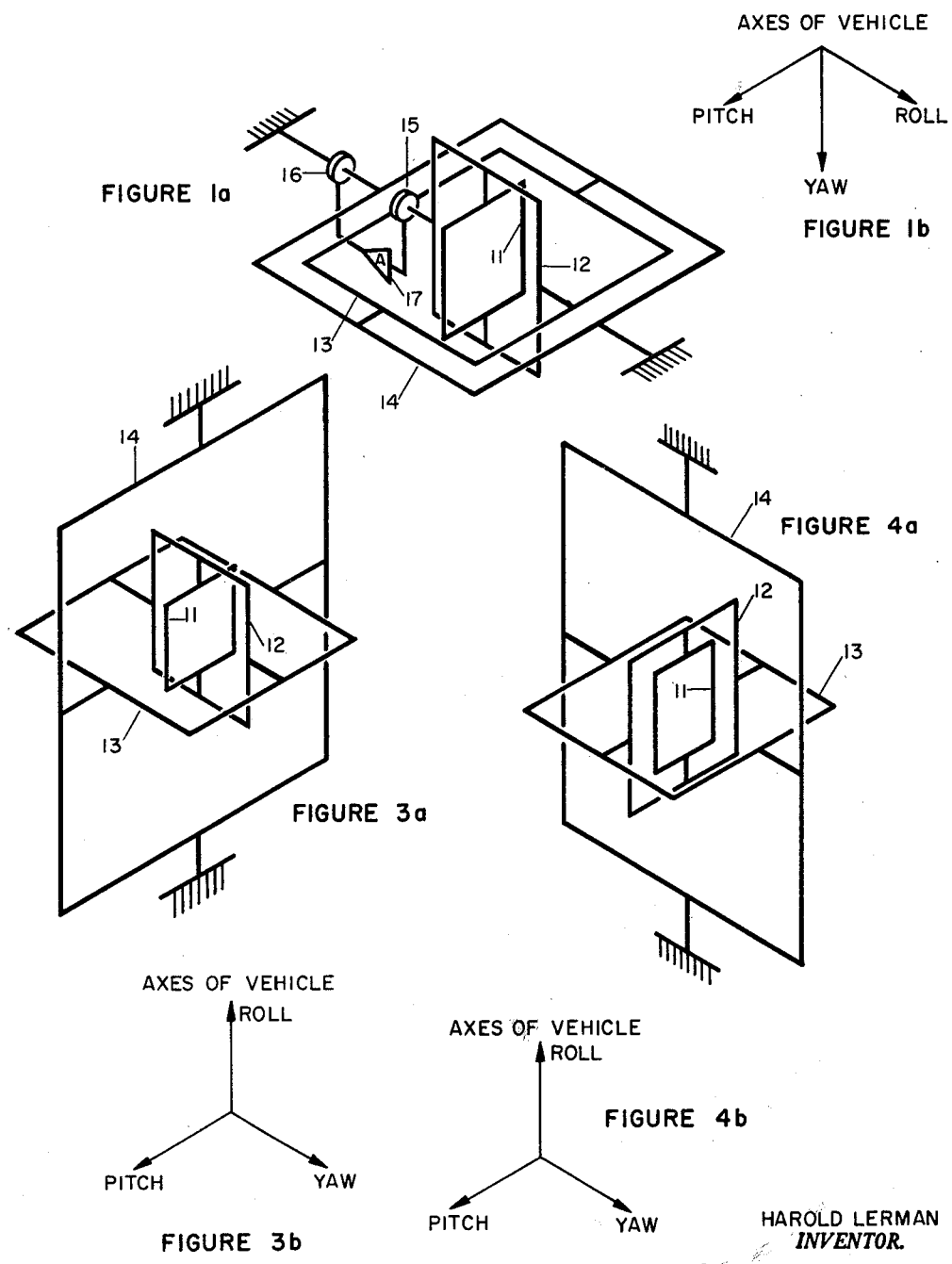

HAROLD LERMAN
INVENTOR.

BY
ATTORNEYS

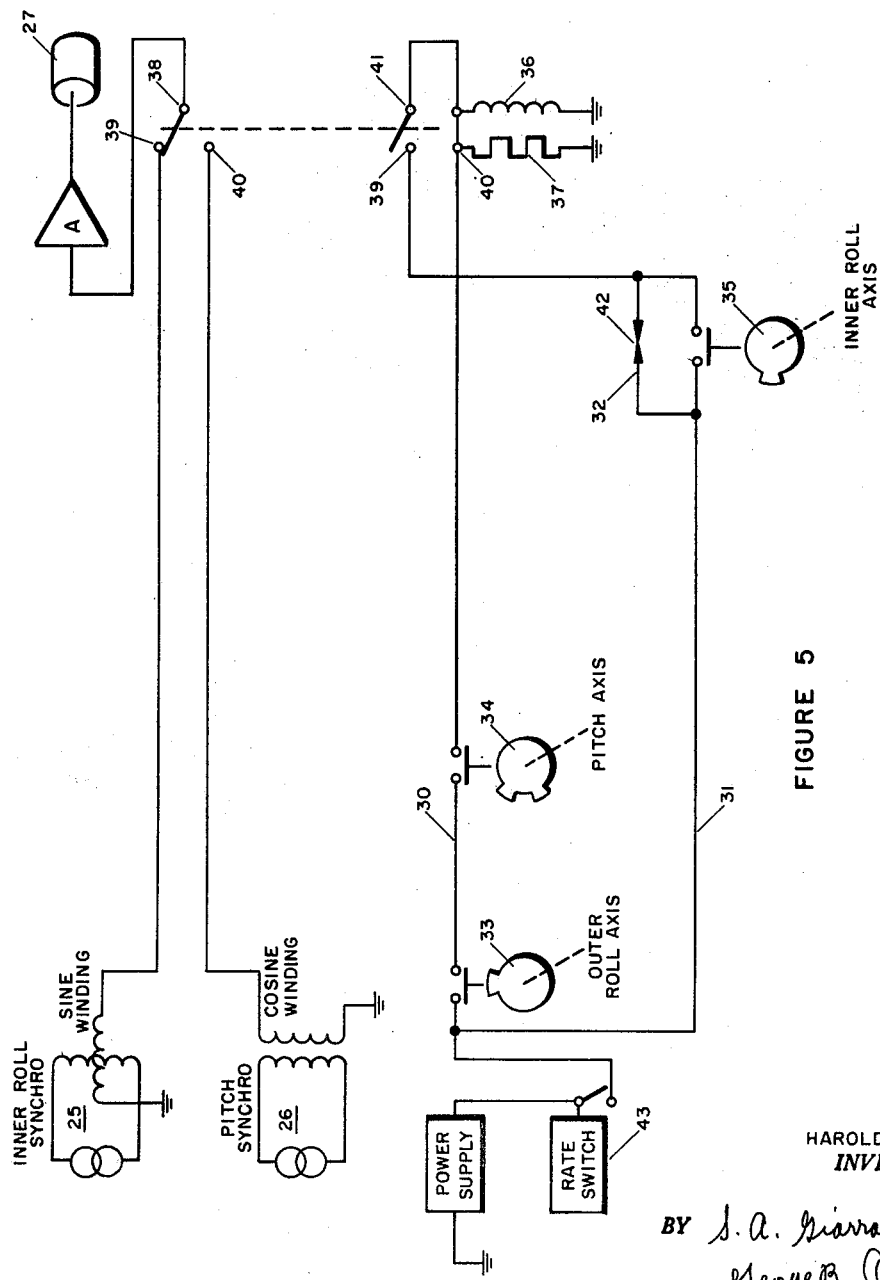

3,188,870
ARRANGEMENT FOR IMPROVING MANEUVER-
ABILITY OF A STABLE PLATFORM
Harold Lerman, Paramus, N.J., assignor to General Precision Inc., Little Falls, N.J., a corporation of Delaware
Filed Sept. 15, 1961, Ser. No. 138,496
3 Claims. (Cl. 74—5.2)

The present invention relates to a stable platform, and more particularly to an arrangement for improving the maneuver capability of a four gimbal stable platform.

A stable platform is a gyroscopic arrangement mounted on a vehicle having three dimensional motion, providing a stable reference on the vehicle independent of the vehicle motion. Thus, the stable platform may be used for the purpose of launching missiles, navigation of the vehicle, etc. A four gimbal stable platform has all attitude capability. There is no restriction in pitch maneuverability. To achieve this properly, the stable platform must move its outer roll gimbal 180° as the pitch angle exceeds 90°. Ideally, the time to flip 180° should be instantaneous, at the 90° point. In practice, the inner roll axis has a limited degree of freedom. The change or reversal of the outer roll gimbal is gradual. Thus, for a short period of time, the platform is receiving improper attitude information. Although attempts may have been made to provide a stable platform in which the maximum pitch rate during a loop maneuver was not limited by the time to move the roll gimbal, none, as far as I am aware was entirely successful when carried out into actual practice.

Thus, the object of the present invention is to improve the pitch loop maneuver capability of a four gimbal stable platform.

Other objects and advantages of the invention will become apparent from the following description and the accompanying drawing in which:

FIGURE 1a is a schematic diagram of a four gimbal platform in the situation where there are zero degrees roll and pitch;

FIGURE 1b illustrates the position of the axes of the platform shown in FIGURE 1a;

FIGURE 3a is a schematic diagram of the platform of FIGURE 1a during a loop maneuver at a pitch angle of 90° with no roll;

FIGURE 3b illustrates the position of the axes of the platform shown in FIGURE 3a;

FIGURE 4a is a schematic diagram of the platform of FIGURE 1a during a loop maneuver after the roll gimbal has flipped 90° with no roll;

FIGURE 4b illustrates the position of the axes of the platform shown in FIGURE 4a;

FIGURE 5 is a schematic diagram of the invention contemplated herein; and,

Figure 6:
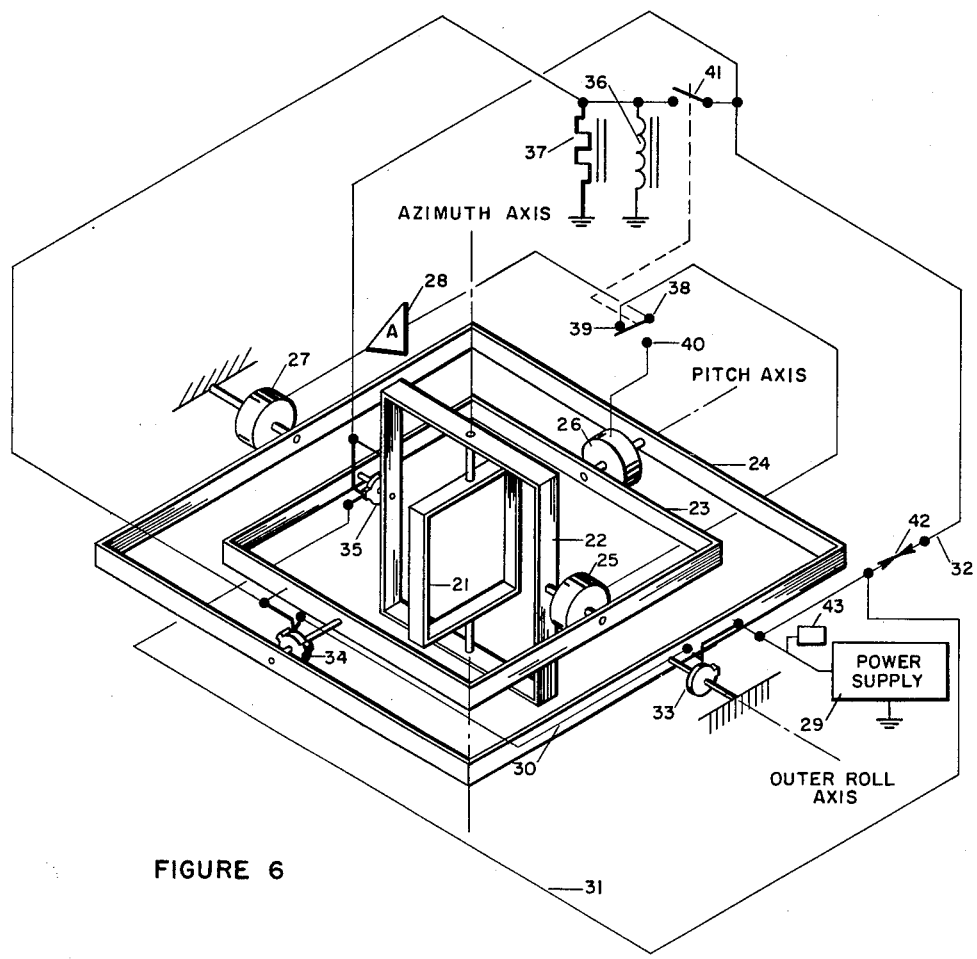
FIGURE 6 is a partially perspective view of the components depicted in FIGURE 5.
Figure 2:
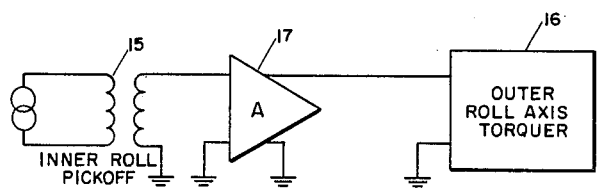
FIGURE 2 shows the conventional prior art configuration for controlling the outer roll axis in schematic form.

To better understand the present invention it is first necessary to visualize the problems which are to be solved. As shown in FIGURES 1a and 1b, the components of the platform are the azimuth gimbal 11, inner roll gimbal 12, pitch gimbal 13 and outer roll gimbal 14. The outer roll gimbal 14 is controlled by the output of inner roll synchro 15 which feeds a torquer 16 on the outer roll gimbal 14. This torquer 16 acting as a part of a servo loop is capable of flipping the outer roll gimbal 180°. At equilibrium, the outer roll gimbal 14 is positioned so that the inner roll gimbal 12 is perpendicular to the pitch gimbal 13 which is the condition required for zero output from the inner roll synchro 15. The inner roll gimbal 12 usually has limited freedom to decrease size and weight of the platform.

During a pitch loop maneuver going through 90° pitch, the platform depends on a servo loop to flip the roll gimbal 180°, i.e., inner roll synchro 15 provides a signal through amplifier 17 to outer roll torquer 16. Assuming a pure pitch maneuver, without roll or azimuth inputs, at 90° pitch the roll gimbal should flip 180° instantaneously. Yet, there is obviously no signal to cause this motion. Practically, there is always some yaw motion in the vehicle. As shown in FIGURES 3a and 3b, the inner roll axis at 90° is coincident with the yaw axis of the vehicle. Thus, there is a signal to start the roll gimbal moving. If the vehicle were able to remain at 90° pitch, the roll gimbal would flip exactly 90° so that the pitch and inner roll axis is disposed to sense any additional motion in pitch. As the vehicle continues to pitch, this additional signal from the inner roll synchro forces the outer roll gimbal to move the additional 90°. Thus, the outer roll gimbal 14 has moved a total of 180°.

When the vehicle is at 90° pitch, outer roll torquer 16 receives a signal from the inner roll pick-off 15 to start its 180° reversal. During this motion, the inner roll axis is displaced B as a function of the roll gimbal displacement D and a pitch rate $\theta$ as per the following equations:

$$B \approx \dot{\theta} t \sin \dot{D} t \qquad (1)$$

$$B \approx \frac{\dot{\theta}}{\dot{D}} D \sin D \qquad (2)$$

where

B is the inner roll gimbal displacement and is a relatively small angle
D is the outer roll gimbal displacement
$\dot{\theta}$ is the pitch rate of the loop maneuver
$t$ is time after the vehicle reaches 90° pitch.

$\dot{D}$ and $\dot{\theta}$ are assumed constant and the roll gimbal instantaneously attains the velocity of $\dot{D}$. The maximum value of B is $$B_{max.} \approx \frac{\dot{\theta}}{\dot{D}}(104°) \qquad (3)$$

$B_{max.}$ must be less than the limited freedom of the inner roll gimbal for the proper operation of the platform.

If the freedom of the inner roll axis is ±15°, and $\dot{D}$ is 300°/second, then the pitch rate cannot exceed $$\frac{15° \ (300°/sec.)}{104°} 43.3°/second$$

In many cases, the maximum pitch rate may be lower since the actual roll gimbal movement must be started by a yaw disturbance at the 90° pitch point.

The foregoing method of outer roll gimbal reversal has several disadvantages. For a pure pitch maneuver, the prior art method depends upon a yaw distubance to initiate the outer roll gimbal reversal. Also, there is no attempt to anticipate the roll maneuver and no action occurs prior to the vehicle reaching the 90° pitch point. Also, the inner roll axis is in the position for maximum pitch coupling when the pitch angle (actually 90° minus the pitch angle) is large. The maximum pitch rate capability of the platform is limited by the parameters set by Equation 3.

In the foregoing prior art method of outer roll gimbal reversal, there is a possibility of the inner roll gimbal hitting its stop which would lose the inertial reference completely.

Generally speaking, the present invention contemplates controlling the outer roll gimbal by switching the control from the sine winding of the inner roll synchro to the cosine winding of the pitch synchro. The time for switching control is determined by the pitch angle or by a combination of the pitch angle and the pitch rate. In general, the outer roll gimbal should have time to move 90° as the vehicle approaches 90° pitch angle. The signal from the cosine winding of the pitch synchro will cause the outer roll gimbal to move exactly 90° at equilibrium. At this position the inner roll synchro senses pitch of the aircraft. As soon as the vehicle exceeds the 90° pitch angle, the inner roll synchro regains control of the outer roll gimbal and drives the outer roll gimbal the remaining 90° to the final equilibrium position. If the vehicle does not complete the loop maneuver, the inner roll synchro again regains control and brings the outer roll gimbal back to its original position. The inner roll synchro itself determines when it shall regain control of the outer roll gimbal.

Thus, the present invention programs the flipping of the outer roll gimbal decreasing the possibility of having the inner roll gimbal hit its stop thereby losing the inertial reference. This is accomplished without requiring a larger size outer gimbal torquer. The degree of freedom of the inner roll gimbal is not increased. Basically, the pitch rate capability of the platform is increased by anticipating the maneuver.

To accomplish the foregoing scheme, it is evident that the outer roll gimbal is to be flipped by 90° prior to the vehicle reaching 90° pitch. Under these conditions, the equation for B is:

$$B \approx \frac{\dot{\theta}}{D} D \cos D \qquad (4)$$

$$B_{max.} \approx \frac{\dot{\theta}}{D}(32°) \qquad (5)$$

The condition for Equation 5 occurs when D is somewhere around 49° so that for the same condition of D and $B_{max.}$, the maximum pitch rate capability is increased by the fraction 104/32 or by 3.25.

The proposed method assumes that when there is an almost pure pitch maneuver as indicated by a small roll angle, it is necessary to switch control of the outer roll gimbal.

This method of outer roll gimbal reversal has several advantages. For a pure pitch maneuver, a positive signal is created to start the outer roll gimbal reversal. The loop maneuver is anticipated and the outer roll gimbal as positioned accordingly. The inner roll axis is in the position for maximum pitch coupling when the pitch angle (actually 90° minus the pitch angle) is small. It moves away from maximum pitch coupling as the pitch angle increases. And, the maximum pitch rate is increased by a factor of 3¼ over the method of loop reversal of the prior art.

In carrying the present invention into practice, the instrumentation depicted in FIGURES 5 and 6 is preferably used. There are as heretofore azimuth gimbal 21, inner roll gimbal 22, pitch gimbal 23 and outer roll gimbal 24. An inner roll synchro 25, a pitch synchro 26 and an outer roll torquer 27 are also provided.

As previously explained, in the prior art method, the inner roll synchro sine winding which in this case is synchro 25 provides the signal to the outer roll torquer, i.e., torquer 27 through amplifier 28. But in accordance with the present invention, at an appropriate time, control is to be switched from the sine winding of inner roll synchro 25 to the cosine winding of the pitch synchro 26. To accomplish this, there is provided from a power source 29, an outer roll and pitch axis circuit 30, an inner roll axis circuit 31, and, an inner roll axis by pass circuit 32. In the outer roll and pitch axis circuit 30 are outer roll axis cam switch 33, the cam being so arranged that the switch closes at somewhere about −10° to about +10° roll; and, a pitch axis double cam switch 34, the two cams being so disposed that the switch will close at 80°±½° and at −80° (280°)±½°. In the inner roll axis circuit 31, is a cam switch 35, the cam being disposed so as to close the switch at a roll angle range of between about −8° (352°) to about 0°. Inner roll axis circuit 31 is normally open and is controlled by one pole 41 of a two pole relay switch 36. Thermal relay 37 prevents premature opening of relay switch 36. The other pole 38 of this two pole relay switch is the control means for feeding information to outer roll torquer 27.

During normal flight, these relay switches are unenergized and the control loop is from the inner roll transducer 25 sine winding to the outer roll torquer 27 across pole 38 of relay switch 36, the switch being set on inner roll contact 39. Upon the proper conditions, the pole 38 will switch to contact 40 of the cosine winding of pitch synchro 26. These predetermined conditions are set by the foregoing cam switch arrangement. For pitch angles below 80°, double pole relay 36 remains unenergized. The inner roll synchro 25 controls the outer roll torquer 27. If the roll angle is within about −10° to about +10°, outer roll axis switch 33 closes. As the aircraft goes into a loop maneuver, pitch axis switch 34 closes at about 80° or −80°. Relay switch 36 is energized and pole 38 moves from inner roll synchro sine winding contact 39 to pitch synchro cosine winding contact 40 and at the same time closes the switch of pole 41 in the inner roll axis circuit 31 and by-pass circuit 32. Thermal switch 37 will prevent the premature opening of relay switch 36 through normally closed contact 42. At this time the inner roll axis senses the vehicle pitch angle and inner roll switch 35 closes. This is in the range of between about −8° to 0°. The pitch synchro 26 forces outer roll torquer 27 to flip the outer roll gimbal 24, 90°. As the pitch angle goes beyond 90°, inner roll switch 35 opens. Control from pole 38 is released and switches back to inner roll synchro 39. This provides the signal necessary for the outer roll torquer 27 to turn the outer roll gimbal 24 the additional 90°. To safeguard against the extremely unlikely condition where the aircraft starts, but does not complete a loop maneuver, it is possible to include a rate switch 43 in series with the power supply and circuits 30, 31 and 32. This rate switch can be so set that if the rate of the maneuver is too slow for the aircraft to complete the loop, the rate switch will open leaving the control from the inner roll synchro 25 to outer roll torquer 27. Rate switch 43 is manufactured by General Precision, Inc., the assignee of the present patent application as a standard component.

It is to be observed therefor that the present invention provides for an improvement in a stable platform which among other components includes inner roll, pitch and outer roll gimbals 22, 23, 24, inner roll and pitch synchromeans 25 and 26 including sine and cosine windings therein, sensing the roll and pitch angles, and an outer roll torquer 27 controlling the outer roll gimbal. The improvement comprises the combination of control means 38 to switch control from the sine winding of the inner roll synchro means to the cosine winding of the pitch synchro means; "and" gate means 33, 34 and 41, switching said control from the inner roll synchro means to the pitch synchro means when the roll axis angle is under somewhere within ±10° and the pitch axis is about +80° or −80°; and, control release means 35, releasing said control means back to said inner roll synchro means as the pitch angle goes beyond 90°. To prevent premature switching of controls, time delay means in the form of a thermal switch 37 is associated with the control means 38, and thermal switch 42 is associated with control release means 35. To prevent incorrect operation in the event of an incomplete maneuver or non-contemplated maneuver rate switch 43 is provided.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

Furthermore, as used herein, the expression "synchro means" is used as a generic term to include such devices as synchros, resolvers, control transmitters and control transformers. This type of device is well known in the art to furnish the sine and cosine of the angular displacement between the gimbals of gyros and platforms.

I claim:

1. In a stable platform having inner roll, pitch and outer roll gimbals, inner roll and pitch synchro means sensing the roll and pitch angles, including sine and cosine windings, and an outer roll torquer controlling the outer roll gimbal, coupled and responsive to a signal from said inner roll synchro means sine winding, the improvement therein comprising; an outer roll and pitch axis circuit including an outer roll axis cam switch, the cam of which is so disposed that said switch closes at a roll angle of about −10° to about +10°, a pitch axis double cam switch, the two cams of which each cover a narrow arc disposed about 160° apart so as to close at a pitch angle of about +80° and about −80°, a two pole relay switch, one switch of said two pole relay switch being in said coupling between said outer roll torquer and said inner roll synchro sine winding disposed so as to switch said coupling from said outer roll torquer to the pitch synchro cosine winding; and, an inner roll axis circuit including therein, an inner roll axis cam switch with a cam arc disposed so as to close the inner roll axis circuit for a roll angle between about −8° and 0°, the second switch of said two pole relay switch, and said relay of the two pole relay so that said relay acts to close said inner roll axis circuit when said coupling to said outer roll torquer is switched, the inner roll axis circuit then acting on said relay while said cam switch is closed in the range of between about −8° and 0° of roll angle.

2. A device as claimed in claim 1, including a thermal delay switch in said outer roll and pitch axis circuit acting on said two pole relay switch to prevent premature opening thereof.

3. A device as claimed in claim 1, including a thermal delay switch in parallel with said inner roll axis cam switch to prevent premature opening thereof.

References Cited by the Examiner
UNITED STATES PATENTS

| | | | |
|---|---|---|---|
| 2,469,782 | 5/49 | Phair | 74—5.2 |
| 2,802,364 | 8/57 | Gievers | 74—5.2 |
| 2,900,824 | 8/59 | Barnes | 74—5.34 |
| 2,909,929 | 10/59 | Granqvist | 74—5.2 |

BROUGHTON G. DURHAM, *Primary Examiner.*

ORIS L. RADER, *Examiner.*